Patented Sept. 21, 1937

2,093,971

UNITED STATES PATENT OFFICE 2,093,971

STABILIZATION OF GLYCERIDE OILS AGAINST OXIDATION

Sidney Musher, New York, N. Y., assignor to Musher Foundation Incorporated, New York, N. Y., a corporation of New York No Drawing. Application November 6, 1933, Serial No. 696,915. Renewed October 5, 1935

2 Claims. (Cl. 87—12)

This application relates to food products, and more particularly to such products which contain oils and fats treated to inhibit any tendency to the formation of rancid products.

In the prior art, it is recognized that glyceride oils, particularly vegetable oils and products made from them, have a tendency to become rancid, which tendency is particularly marked in many of the vegetable oils. There are substantial differences between the tendency to rancidity in the various types of oils, and also as between the refined and unrefined oils of the same kind. It is recognized that crude vegetable oils when crushed from good seed and properly protected from moisture, air and light, will usually keep for relatively long periods of time. This is particularly true of those oils that do not have a high moisture content in the original seed or nut. But this would not be true of such oils as cottonseed oil because of the fact that the original cottonseed contains a relatively high moisture content, together with a relatively high mucilaginous matter content, making the crude oil subject to relatively quick rancidity, so that it is necessary that such oil be causticated and converted into its prime summer yellow and prime summer yellow bleachable state, as known to the trade, for keeping after the seed is crushed.

Similarly the fully refined oils crushed from different seeds have relatively different keeping qualities, dependent upon such factors as those mentioned above. (By full refining is meant the complete treatment including causticating, bleaching or winterizing and deodorizing, as differentiated from ordinary causticating, sometimes referred to as the first process of refining.) For instance, refined cottonseed oil does not have the same keeping qualities as refined sesame oil, but nevertheless, within normal periods of time, each of these oils has its own tendency to become rancid, and the rancidifying substances will act upon the original oil in their own particular manners, causing a different type of rancidity to take place, at least sufficiently different for the expert to detect to a substantial degree whether such original non-rancid oil was cottonseed, sesame, etc.

And while it is of course recognized that rancidity is a term that can only be defined relatively in view of the fact that auto-oxidation may take place after the form of a parabolic curve, the tendency to rancidity of the different oils is subject to the treatment given to the oil, although it should be noted that in course of time all oils and fats normally used for edible purposes turn rancid within a relatively short period of time, particularly if such oils are used for frying or baking where high heat temperatures are required, whereby the fatty glycerides are easily broken down into the aldehydic, ketonic and other substances that distinguish a rancid oil or fat from a non-rancid one.

In my prior Patent 1,816,338 granted July 28, 1931, there are claimed food products containing butters and crushed sesame seed. In my prior Patent 1,841,842 granted January 19, 1932, there are claimed milk products in admixture with crushed sesame seed. In the instant case, there are claimed oil or fat products in combination with a sesame product.

Among the objects of the present invention is the production of such oils and fats, particularly of the edible type, which have been treated to reduce their tendency to rancidity.

Other objects include the production of novel types of compositions containing such oils and fats of modified flavor and/or taste of pleasing character, which modified flavor or taste is imparted to foods and food products made with such oils and fats.

Still further objects include the production of such food products which maintain the modified flavor and taste over relatively long periods of time without substantial change, and particularly without those changes to which the untreated oils are normally susceptible.

Other and further objects will appear from the more detailed description set forth below, it being understood, however, that such more detailed description is given by way of illustration and explanation only, and not by way of limitation, since various changes may be made therein by those skilled in the art without departing from the scope and spirit of the present invention.

In carrying out the present invention, the desired oils and fats, particularly of the edible glyceride type, are employed, and are treated to increase their stability against any tendency to become rancid, at the same time that desirable modified flavor or taste is produced therein. For such modification, sesame seed products are employed. In the utilization of sesame seed products in producing the treated oils and fats, the sesame seed may be crushed and utilized in crushed form for addition to the edible oil or fat, or the sesame seed, desirably in crushed form, may be extracted by the desirable edible oil or fat. These several methods will be illustrated below.

Preferably before utilizing the sesame seed, it is subjected to a treatment to remove the outer shell, and the ordinary blanching treatment may be utilized for this purpose, the sesame seed being blanched in the customary manner, whereby the very light weight outer shell is removed, and the inner kernel with its higher oil content freed from the outer shell. After removal of the outer shell from the seed, the seed is subjected to a drying process to remove the moisture, and desirably this is accomplished at the lowest possible temperature in order to avoid any roasting effect. By the use of vacuum, for example, it is possible to dry the seed at temperatures not exceeding 150° F. to remove all of the moisture, particularly that which has accumulated in the seed during the blanching process. The dried seed may then be ground, as in ordinary spice grinders, the minimum of heat being applied, to give a resultant product that appears as a grayish pasty material with a minimum of dark color, and with a persistent and long lasting sweetness in flavor and mildness in odor.

It should be noted that this resulting product is substantially different from the sesame seed product ordinarily known as Tachino, the latter being one of the foods commonly used by people of foreign countries, particularly those from Greece and Turkey, where the Tachino is made by blanching and roasting to remove the moisture, and at the same time to develop the roasted or burnt flavor or odor.

The material produced in accordance with the instant invention and referred to generally as crushed sesame seed has been given a minimum of treatment, and is substantially straight sesame seed with the outer shell removed, which has been subjected to a grinding process, in which the oil and the cake remain in intimate suspension, which even on standing shows but little separation of oil from cake, the purpose being to maintain the oil and cake in suspension, rather than to produce separation of one from the other.

This crushed sesame seed product produced as above, may be incorporated with any desired oil or fat in proportions necessary to increase the stability of the oil or fat against the development of rancidity. A relatively small amount of crushed sesame seed incorporated with the desired oil, such as cottonseed salad oil, will materially and substantially stabilize the oil against the development of rancidity. The amount of sesame seed thus added to the oil need not be greater than a relatively small amount, such as from 5 to 10%, and need not generally be greater than approximately 20% in amount.

For example, the crushed sesame seed may be added to a fully hydrogenated shortening in an amount of from 5 to 7½% of the crushed sesame seed to give the shortening substantial protection against rancidity, and also to yield to the shortening, the peculiarly pleasant, sweet taste and odor which results from the incorporation of the crushed sesame seed. The incorporation of even such relatively small percentages of crushed sesame seed protect the product against rancidity for an unusually long period of time, at the same time that the odor and flavor are pleasantly affected.

As a further example, the crushed sesame seed may be incorporated with straight refined deodorized 76° cocoanut oil, utilizing about 10% of the crushed sesame seed, and the resulting oil has the property of keeping for about three times as long as did the cocoanut oil without the added sesame seed.

In actual baking experiments conducted with hydrogenated shortenings containing crushed sesame seed, utilizing such fat for pastries for instance, the finished pastry had an odor and flavor that very much approached the odor and flavor of the same pastry made with butter as distinguished from the perfectly bland pastry lacking in odor and flavor which results when the fully hydrogenated shortening is used in making such pastry without the inclusion of the crushed sesame seed. This is particularly important to the baker in baked products where the percentage of shortening used is high, such as in pastry where it may average from 30 to 35%. Similarly for sandwich fillings, the cocoanut oil with the crushed sesame seed gives the desired keeping quality and flavor referred to above.

It has been found that such glyceride oils, particularly of the vegetable oil or fat type, may be utilized to extract from the crushed sesame seed, those properties and characteristics which increase the resistance of the oil or fat to development of rancidity, and it is not necessary that the cake or seed fibers remain in the oil. Thus ordinary winter pressed deodorized cottonseed salad oil may be admixed with approximately 10% of the crushed sesame seed. The resulting mixture may be heated to 150° F. for approximately 15 minutes, and then filtered or centrifuged to remove the cake material, which after allowing for its oil content, would be present in this mixture to the extent of approximately 4%.

The resultant oil after removal of the cake material, has a peculiarly pleasant, sweet flavor and odor that may be described in various ways, some referring to it as a malt flavor, and others to a cereal flavor, but the treated oil has an imparted flavor and odor of pleasant character that distinguishes materially from the untreated cottonseed oil, so that the cottonseed oil infused with the sesame seed, even after removal of the cake, is an entirely new and distinct product from the untreated cottonseed oil.

Although the cake has been removed from the oil after the treatment referred to above, the resultant oil is strictly non-rancid. Its keeping properties are substantially increased. For example, such oil subjected to 180° F. for 100 hours in an open container developed no objectionable odor or flavor, whereas the cottonseed oil without the infusion of sesame seed, used as a control in the same experiment, became thoroughly objectionable and substantially rancid after 50 hours at the same temperature, and under the same conditions of treatment.

Other experiments yielded similar results. For instance, the mixture was heated to a temperature of 180° C. and six square inch pieces of filter paper, on which had been placed one cc. of water, were dropped into the oil in order to give it the effect of potato chip frying without taking on any of the potato odor or flavor. After the water had been completely removed at this temperature, the oil was allowed to cool. The procedure was repeated approximately ten times with the sesame infused oil, and with the cottonseed oil without such infusion. At the end of the third time, the cottonseed oil without the infusion of sesame seed, was completely rancid, whereas at the end of the tenth treatment, the infused oil retained its peculiarly sweet odor and flavor.

The protection against rancidity which is obtained by such treatments as those given above, is not only a result of change in flavor alone, but involves some chemical change apparently. For example, it was found that a small quantity of fully hydrogenated, odorless and tasteless shortening having a fatty acid content of .025%, after standing for 48 hours at 100° C. will ordinarily show a fatty acid content of .1%, whereas the same odorless and tasteless fully hydrogenated shortening after infusion with 7½% of the described crushed sesame product with subsequent filtration of the cake, shows a fatty acid of .028%, which after standing for 48 hours at 100° C. increased only to .04%. This is an indication of the chemical protection which is given to the ordinary oil or fat by the treatment set forth herein.

In another test that was run with a hydrogenated shortening, the following results were obtained. This hydrogenated shortening without any infusion from the sesame seed, was subjected to a heat treatment at 100° C. for 48 hours. The fatty acid and smoke point results on this product before and after such treatment were as follows:

|  | Fatty acid | Smoke point |
| --- | --- | --- |
|  | Percent | ° F. |
| Before | .028 | 453 |
| After | .150 | 444 |

The same shortening infused with 7½% of the crushed sesame and filtered showed the following characteristics:

|  | Percent | ° F. |
| --- | --- | --- |
| Before | .04 | 453 |
| After | .062 | 448 |

The same shortening infused with 7½% of the crushed sesame seed product and without filtration of the cake showed the following:

|  | Fatty acid |
| --- | --- |
|  | Percent |
| Before | .04 |
| After | .044 |

It may be noted that where the meal is permitted to remain in the oil, the free fatty acid is scarcely affected at all. But it should also be noted that even with filtration of the cake from the infused oil, substantial and important results were secured.

The utilization of the sesame seed products for prevention of rancidity of oils in food products may be applied in various other ways, and may be utilized, for example, in preventing rancidity in coffee due to changes in the coffee oil. Thus the crushed sesame seed may be utilized with the coffee during the roasting and grinding operations to protect the coffee oil against development of rancidity subsequently.

While there has been particularly emphasized above the utilization of the sesame seed products in prevention of rancidity in edible oil or fat compositions, these products may also be utilized in other ways, for example, in preventing rancidity in the so-called super-fatted soaps by addition of small quantities of finely ground sesame seed products into the crutcher or into the soap material just prior to the finishing step.

In incorporating the extracts of sesame seed which may be obtained by treatment with an edible oil or fat as set forth above, into other food materials, this may be done in any desired way. And an oil infused with the extract from the sesame seed may be added to another edible oil to protect the latter against the production of rancidity without utilizing the oil last named as the particular extracting medium.

It should also be noted that the residual cake left over after the extraction of the oil, or what may be stated to be substitution of the antirancidifying substances in the cake and in the oil, or with the other oil with which it may be admixed, that such cake has desirable edible characteristics, and is available for marketing as an edible product at a price considerably higher than the cake normally obtained by crushing the seed to remove the oil, the cake in the latter instances being substantially inedible for human consumption, and being utilized only in connection with cattle feed, for fertilizer purposes, etc.

The treatment of the oils as set forth above, either by actual incorporation of the sesame seed product into the oil, or by extraction from such seed by means of the oil, imparts to the oil substantial protection against the development of rancidity. It is believed that such protection is obtained by actual transfer of substances from the seed meal to the oil which is treated. For example, it has been found that much more satisfactory results are obtained by the method set forth above than is secured by crushing oil from the sesame seed, and utilizing such oil for admixture with other edible oils. It is preferred, therefore, in imparting the properties of resisting rancidity to edible oils, to utilize either the actual incorporation of the crushed sesame seed with the edible oil, or to utilize the edible oil which is to be protected against rancidity, as the medium for making the extraction of desirable substances from the seed.

And as noted, it is not only that the anti-rancidifying substances which are removed from the very cake itself and transferred into the oil normally subject to rancidity, so that the resulting product is substantially free from the objectionable feature that edible oils and fats normally exhibit, but such treated oils also exhibit the peculiarly pleasant sweet odor and flavor that are obtained as the result of the addition of or infusion of the sesame seed. This is well illustrated by the fact that fully hydrogenated shortenings containing sesame infusions and otherwise modified in accordance with this invention, have provoked the comments of users that such material exhibits a fine freshly rendered lard odor, without any of the objectionable characteristics that lard usually takes on. This is important since lard itself and the odor of lard is usually looked upon as being desirable in the production of a desirable finished product as a baking compound.

Further it should be noted that the teachings of the present invention may be utilized desirably in connection with animal fats and oils, or related products, such as for example lard, which may be infused or otherwise treated with the sesame products in accordance with the present invention to yield a final modified lard or similar products of superior keeping qualities, not only to lard ordinarily, but even to that of the cottonseed oil products. The importance of this is shown by the fact that the lard industry for the past ten years has been seriously affected by two factors, the first that the use of vegetable products has been increasing, and secondly because although the shortening value of lard is recognized as superior to similar vegetable oil products,—meaning by shortening value creaming quality, water absorption, and similar facts that influence cake baking, pie baking, etc.—the keeping quality of lard is so much inferior that it can be employed only for the cheaper type of commodities. This is one reason at least why lard today is selling at a price from 25 to 30% under that of the cheapest types of cottonseed oil compound shortenings. The infusion of the lard with the sesame seed products, or the incorporation of the sesame seed material with the lard, yields a lard of far superior keeping qualities as noted above, with only a very nominal and small increase in cost of production.

These and other facts set forth above emphasize the important results obtained in accordance with the present invention.

Having thus set forth my invention I claim:

1. A refined glyceride selected from the group consisting of oils and fats subject to rancidity carrying a small percentage of a direct infusion of sesame seed including anti-rancidity constituents sufficient to inhibit substantial rancidity in said glyceride, the glyceride being substantially free from seed fibers.

2. An edible refined glyceride selected from the group consisting of fats and oils subject to rancidity, which glyceride includes at least glycerides other than sesame oil, said glyceride carrying a small percentage of a direct infusion of not more than 20% of crushed sesame seed including anti-rancidity constituents sufficient to inhibit substantial rancidity in said glyceride, said glyceride being substantially free from seed fibers.

SIDNEY MUSHER.